(12) United States Patent
Fleet (10) Patent No.: US 7,577,506 B2
(45) Date of Patent: Aug. 18, 2009

(54) EMPTY SEAT DETECTION VIA SPECTRAL ANALYSIS

(75) Inventor: Chad Van Fleet, Salem, MI (US)

(73) Assignee: Robert Bosch GmbH, Stuttgart (DE)

( * ) Notice: Subject to any disclaimer, the term of this patent is extended or adjusted under 35 U.S.C. 154(b) by 814 days.

(21) Appl. No.: 11/188,318

(22) Filed: Jul. 25, 2005

(65) Prior Publication Data

US 2007/0021891 A1    Jan. 25, 2007

(51) Int. Cl.
*B60R 22/00* (2006.01)

(52) U.S. Cl. ............................ 701/45; 701/46; 180/268; 180/273; 280/735

(58) Field of Classification Search .................. 701/45, 701/46; 280/734, 735; 180/268, 271, 272, 180/273
See application file for complete search history.

(56) References Cited

U.S. PATENT DOCUMENTS

| 5,164,709 | A | 11/1992 | Lamberty et al. |
| 5,404,128 | A | 4/1995 | Ogino et al. |
| 6,246,936 | B1 | 6/2001 | Murphy et al. |
| 6,271,760 | B1 | 8/2001 | Watanabe et al. |
| 6,438,477 | B1 | 8/2002 | Patterson et al. |
| 6,509,653 | B2 | 1/2003 | Fujimoto et al. |
| 6,542,802 | B2 | 4/2003 | Gray et al. |
| 6,577,023 | B1 | 6/2003 | Stanley et al. |
| 2002/0171540 | A1 | 11/2002 | Ando et al. |
| 2003/0000757 | A1 | 1/2003 | Ishida et al. |
| 2003/0040858 | A1 | 2/2003 | Wallace |
| 2003/0056997 | A1 | 3/2003 | Breed et al. |

*Primary Examiner*—Gertrude Arthur Jeanglaud
(74) *Attorney, Agent, or Firm*—Michael Best & Friedrich LLP (57) ABSTRACT

A module and method for determining whether a seat is empty. In one embodiment, the module includes a projection module that is configured to receive force data that includes a plurality of modes. The projection module is also configured to isolate data for one of the modes. A transform module is configured to communicate with the projection module, and to transform the data for one of the modes into a frequency domain, thus generating spectral mode data. In addition, a spectral analysis module is configured to communicate with the transform module, and to classify the spectral mode data.

28 Claims, 6 Drawing Sheets

EMPTY SEAT DETECTION VIA SPECTRAL ANALYSIS

BACKGROUND

Many vehicles include airbag and other occupant-safety systems that protect vehicle occupants during a collision. However, some occupant-safety systems can cause injuries. For example, airbag systems can cause injury due to overly forceful airbag deployment. To eliminate or reduce such injuries, some airbag systems determine the weight of the vehicle occupants, and control the airbag deployment as a function of occupant weight. Weight may be measured by sensors located within an occupant seat.

In some systems, weight information is used to classify a vehicle occupant into a group, such as adult, child, and infant, and airbag deployment is controlled as a function of the group. For example, if an occupant is classified as a "child," the airbag is deployed with less force then would be used if the occupant is classified as an "adult." If an occupant is classified as an "infant," the airbag is disabled to prevent deployment.

SUMMARY

Although sensing weight can help improve occupant-safety systems, the sensors used in such systems are subject to offset. Offset may cause the sensors to make incorrect measurements and result from a variety of factors, some of which may be uncontrollable. These factors include sensor fatigue, deformation, degradation, aging, corrosion, seat deformation, and thermal shock.

An offset may be measured so that its effect on weight measurements may be reduced or eliminated. However, because offset generally cannot be distinguished from an object of equivalent weight, offset is usually measured when the seat is empty as determined for example, by a visual inspection by a person. In addition, offset is generally measured when the seat is in a static state, that is, when the seat is not experiencing loads caused by vehicle motion, occupant restraint systems, or other objects or phenomena that may cause sensors to register a force that is not due to the weight of an occupant. A consistent reading or measurement, for example, a reading of the weight of the seat (or a reading that is within an acceptable tolerance of that weight) should be generated by the sensors when the seat is empty and in a static state. Of course, the system or sensor could be calibrated or configured in a manner such that the weight of the seat is ignored and, as a consequence, a zero or near zero reading or measurement is generated when the seat is empty. A measurement other than the weight of the seat or a zero value registered under such conditions provides an indication of the existence of an offset condition.

While the methodology described above (sometimes referred to as "static detection") can be used to determine the existence of an offset, one drawback is that the methodology generally relies on the availability of a person or other second source of information to determine whether a seat is empty. Such sources of information are not always available or reliable. For example, once a vehicle with an occupant-safety system leaves its place of manufacture, offset testing using static detection would likely require a consumer to have its vehicle serviced by a trained technician to adjust for any offset that occurred as a result of sensor or vehicle wear. The system itself would, in general, be incapable of determining an offset on its own. For example, a light object might cause weight sensors to register a near zero value. But, without visual information regarding whether a seat is empty, the weight measurement of a light object might be mistaken for an offset. A weight threshold could be used to accommodate readings that might be caused by light objects, but this affects the magnitude of offsets that can be corrected.

Therefore, in one embodiment an airbag system that uses spectral analysis to determine when a seat is empty is provided. Among other things, the system allows improved detection, measurement, and correction of sensor error due to offset. Spectral detection is relatively insensitive to the size or magnitude of sensor offset errors and sensor gain errors. Further, spectral detection enables the detection of failed or degraded sensors, which might not be detected otherwise. For example, because spectral analysis allows the system to detect offsets autonomously, sensor checks can be run periodically, for example, each time the vehicle has been turned off and the doors locked (which one might assume indicates that the vehicle is unoccupied and in a static state). If a sensor fails to produce an output during a periodic check, a catastrophic sensor failure might be assumed. In addition, if one sensor reading is significantly different from other sensor readings, a sensor failure might be assumed.

In one embodiment, spectral analysis is used to analyze the vibration patterns of a seat. In a general sense, the vibration patterns of a seat subject to the mass of an occupant follow the formula for a mass on a spring with one degree of freedom:

$$f_o = \frac{\sqrt{\frac{k}{m}}}{2\pi} \tag{1}$$

where $f_0$ is the resonant frequency, k is the spring constant, and m is mass. Therefore, if $f_0$ is known, the mass and, thus, the weight of the occupant may be determined. However, the order of the system is actually greater than one (has multiple resonances), k has six degrees of freedom, and $f_0$ cannot be measured directly. Therefore, one embodiment uses a high dimensional classifier to classify the sensor measurements as "empty" or "not empty." In addition, the classifier may classify the measurements as "unknown."

One embodiment provides a module for determining whether a seat is empty. The module includes a projection module configured to receive force data that includes a plurality of modes, and to isolate data for one of the modes. A transform module is configured to communicate with the projection module, and to transform the data for one of the modes into a frequency domain, thus producing spectral mode data. A spectral analysis module is configured to communicate with the transform module, and to classify the spectral mode data.

Another embodiment provides a method for determining whether a seat is empty. The method includes isolating one of a plurality of modes of force data, transforming one of the modes of the force data into a frequency domain, thus producing transformed mode data; and performing spectral analysis on the transformed mode data to classify the transformed mode data.

Other features and aspects of the invention will become apparent to those skilled in the art upon review of the following detailed description, claims, and drawings.

BRIEF DESCRIPTION OF THE DRAWINGS

The components in the attached figures are not necessarily to scale, emphasis instead being placed upon illustrating the FIG. 1 is schematic illustration of an airbag system in a vehicle, which is illustrated in phantom.

DETAILED DESCRIPTION

Figure 1:
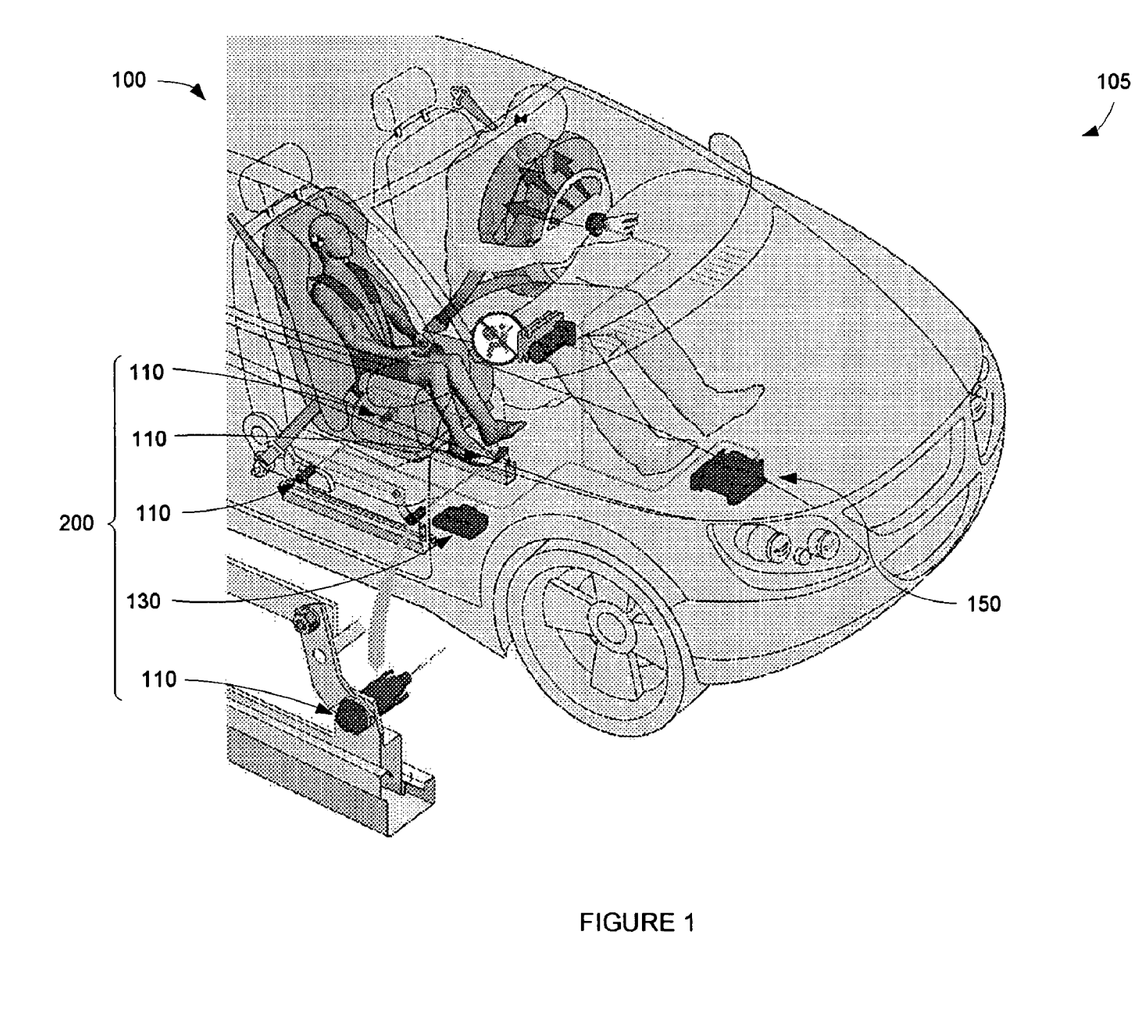

An example of an airbag system is shown in FIG. 1. As shown in FIG. 1, the airbag system 100 is installed in an automobile 105. However, the airbag system 100 may be installed in other vehicles, such as trucks, boats, aircraft, all-terrain vehicles, snowmobiles, etc. The airbag system 100 may include a plurality of sensors 110, a control unit 130, and an airbag deployment controller 150. Together, the sensors 110 and the control unit 130 form an occupant weight system 200. The sensors 110 are generally located under one or more of the seats in a vehicle. A type of sensor known as an i-Bolt™ sensor (manufactured by Robert Bosch GmbH) is shown, but other force or weight sensors may be used. Although four sensors 110 are shown in FIG. 1, the airbag system 100 may include a different number of sensors located in other locations within the seat. For example, the sensors 110 may be of a type and located such that they are sensitive only to vertical forces on the seat.

As shown in FIG. 1, the occupant weight system 200 is implemented in the front passenger seat of the automobile 105. However, the occupant weight system 200 may be implemented in any seat of the automobile 105. With regard to the driver's seat, it may be assumed that the occupant of the seat is a legally-licensed driver and, therefore, of sufficient age and size that modification of airbag deployment is unnecessary. Accordingly, the driver's seat need not be fitted with an occupant weight system 200. However, some drivers (such as smaller women) may benefit from modification of airbag deployment. Thus, an occupant weight system may be included in the driver's seat if desired.

The sensors 110 are generally in communication with the control unit 130, which may be in communication with the airbag deployment controller 150. The airbag deployment controller may be preprogrammed with properties of airbag deployment, such as force and timing of deployment, and the circumstances required for deployment. The control unit 130 generally determines the weight of an occupant according to the measurements taken by the sensors 110. An occupant may include a person, animal, or object. The word "object" is sometimes used to refer to any thing or person that might be located in or on a seat or surface of a seat.

The control unit 130 may produce a control signal that is communicated to the airbag deployment controller 150. The control unit 130 may additionally classify the seat occupant based on the determined weight, and produce a control signal based on the classification. For example, if the control unit 130 classifies an occupant as a child, it may produce a control signal that instructs the airbag deployment controller 150 to deploy the airbag with a lower deployment force than would be used if the occupant were classified as an adult. In another example, if the control unit 130 classifies an occupant as an infant, it may produce a control signal that instructs the airbag deployment controller 150 to disable the airbag so that it does not deploy.

Figure 2:
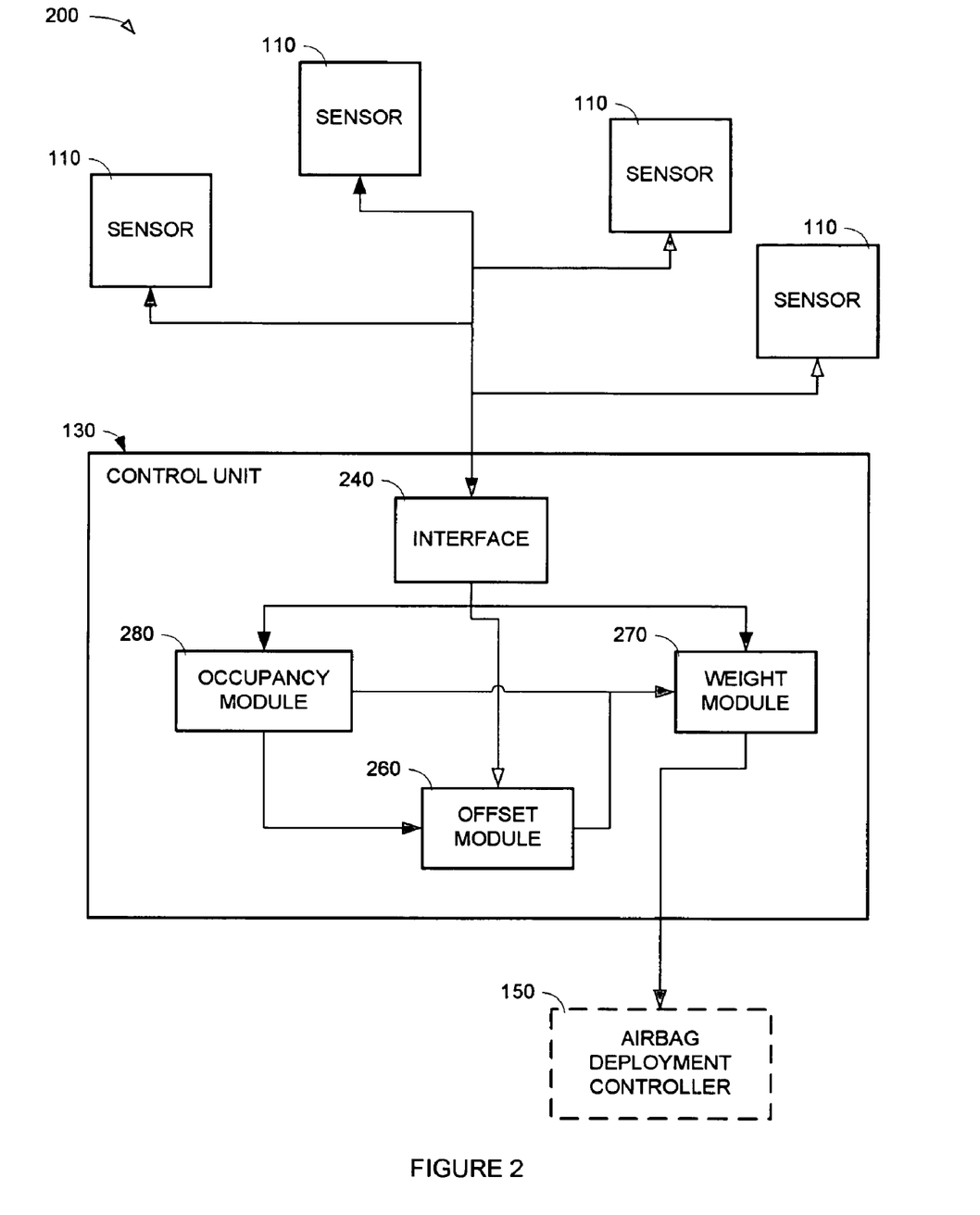
FIG. 2 is a block diagram of components of an occupant weight system.

The occupant weight system 200 is shown in greater detail in FIG. 2. The control unit 130 includes an interface 240 that converts the signals received from the sensors 110 into a format that may be processed by the control unit 130. The interface 240 may include an analog-to-digital converter to convert the analog signals produced by the sensors 110 into digital signals. However, if the sensors 110 produce digital signals, the analog-to-digital converter may not be needed. The interface 240 may also convert other analog signal, such as those that indicate vehicle speed and buckle switch status, into digital signals. These other signals may be produced by a bus in the vehicle, such as a control area network (CAN) bus or a local interconnect network (LIN) bus. Although vehicle speed and buckle switch status are not required to determine whether a seat in the vehicle is empty, they may be used alone or in combination to prevent such determination when the vehicle is not moving, or when the buckle switch indicates that there is an object in the seat.

The signals produced by the sensors 110 indicate the force exerted on the seat. The force exerted on the seat includes those forces due to an occupant or other object located on the seat, vehicle dynamics, intrinsic loads, and other forces. Vehicle dynamics depend on the travel surface (such as a road, air, or water), speed and acceleration, and the physical characteristics of the vehicle (such as, tire inflation, tilt, and suspension). Intrinsic loads are typically the result of tolerance deviations in the sensors and represent energy stored in the structure of the seat. The other vertical forces are due to gravity, such as the self-mass of the seat located above the sensors. Additionally, the force on the seat may include intrinsic forces (those not due to the occupant), such as those caused by seat belts under tension and objects wedged in the seat, and other objects or occupants leaning on the seat.

The force information may be communicated to an offset module 260, a weight module 270, and/or an occupancy module 280. In one embodiment, the occupancy module 280, weight module 270, and the offset module 260 work together to determine the weight of the occupant when the seat is not empty. Using the force information received from the sensors 110, either directly or indirectly through the interface 240, the occupancy module 280 uses spectral analysis to determine whether the seat under which the sensors are located is empty. If the seat is empty, the occupancy module 280 communicates a signal to the offset module 260 instructing the offset module 260 to determine the offset of the sensors. The offset module 260 determines the offset using the force information and communicates the offset to the weight module 270. If the seat is not empty, the occupancy module 280 instructs the weight module 270 to determine the weight of an occupant according to the offset determined by the offset module 260 the last time the seat was empty. In addition, the occupancy module 280 may determine that the occupancy of the seat is unknown. In this case, the occupancy module 280 may instruct the weight module 270 to determine the weight of the occupant without correcting for offset errors. In addition, the weight module 270 may classify the seat occupant based on the determined weight, and produce a control signal that is communicated to the airbag deployment controller 150.

Figure 3:
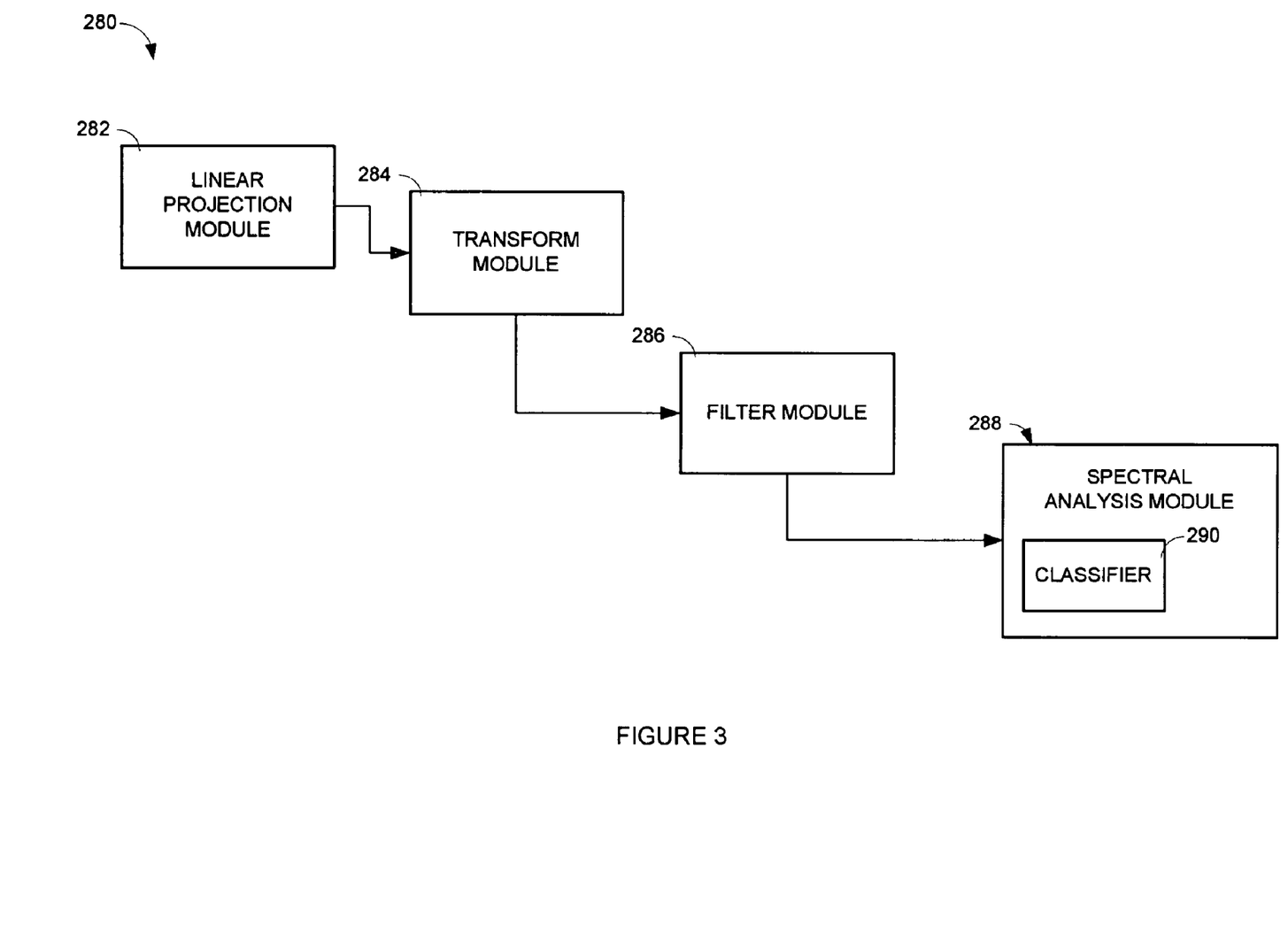
FIG. 3 is a block diagram of components of an occupancy module.

As shown in FIG. 3, the occupancy module 280 may include a linear projection module 282, a transform module 284, an optional filter module 286, and a spectral analysis module 288. The linear projection module 282 receives force information from the sensors 110, either directly or indirectly through the interface 240 (see FIG. 2). The force information may be considered as having a number of modes, where the number is generally equal to the number of sensors 110 (FIG. 2). The linear projection module 282 combines the information from the sensors 110 and separates out one or more particular modes for further evaluation. For example, the linear projection module 282 may separate out the vertical mode. The linear project module 282 communicates information relating to the one or more modes (the "mode data") to the transform module 284.

The transform module 284 transforms the mode data into the frequency domain, thus producing a spectrum of the mode data (the "spectral mode data"). The spectral mode data is communicated to the spectral analysis module 288. In general, the spectral analysis module 288 classifies the spectral mode data as "empty" or "not empty" according to a spectral analysis. Further, the spectral analysis module 288 may classify the data into a third category—"unknown." The spectral analysis module 288 may include a classifier 290 to make the classification. The classifier 290 may include a type of multidimensional classifier, such as neural network, linear discriminant, fuzzy classifier, support-vector machine, or Bayesian network. The spectral analysis module 288 may also use a probabilistic model for the classification.

In the embodiment shown, the optional filter module 286 receives mode data from the transform module 284 and filters that data to improve the signal-to-noise ratio of the mode data. The filter module 286 may include an infinite impulse response ("IIR") or finite impulse response ("FIR") type filter, or other filter that filters the spectral mode data on an element-wise basis.

Generally, the occupant weight system 200 is powered by the power source of the vehicle in which it is installed and operates only when the vehicle is running. However, the offset module 260 may operate when the vehicle is not running. For example, if an occupant weight system 200 is installed in a driver's seat, it is unlikely that the seat will be empty while the vehicle is running. Therefore, if it is assumed that the driver's seat is empty when the vehicle is not running, the offset module 260 may determine the offset under this circumstance. Alternatively, the occupancy module 280 may also operate when the vehicle is turned off to determine if the seat is empty. When the occupancy module 280 determines that the seat is empty, the offset module 260 may determine the offset. However, operating the occupancy module 280 and/or the offset module 160 when the vehicle is not running, may cause a drain on the vehicle's power supply, unless an alternate power source is used.

The control unit 130, interface 240, offset module 260, weight module 270, occupancy module 280, components 282, 284, 286, 288, 290, or a combination of the foregoing, may be implemented in hardware, software, or a combination of hardware and software. Each of these components may include or be in communication with one or more processors and/or one or more computer-readable memory devices (not shown). The memory device or devices may include fixed or removable digital storage devices and, if needed, a device for reading the digital storage device, including floppy disks and floppy drives, CD-ROM disks and drives, optical disks and drives, hard-drives, RAM, ROM and another device or devices for storing digital information. The processor may include a device or devices used to process digital information, such as a digital signal processor ("DSP") and/or a microcontroller. The one or more processors and memory devices may be internal, external, or remote to control unit 130, interface 240, offset module 260, weight module 270, occupancy module 280, or the components 282, 284, 286, 288, and 290.

As shown in FIG. 2, the interface 240, offset module 260, weight module 270, and occupancy module 280 are separate components (which may include hardware or software). Alternatively, some or all may be located or combined together in a single device, or in combinations of devices. The interface 240, offset module 260, weight module 270, occupancy module 280, and the components 282, 284, 286, 288, and 290 may communicate with each other using suitable links such as wired, wireless, or optical connections. When implemented in software, communications may occur through parameter passing and other known mechanisms.

Figure 4:
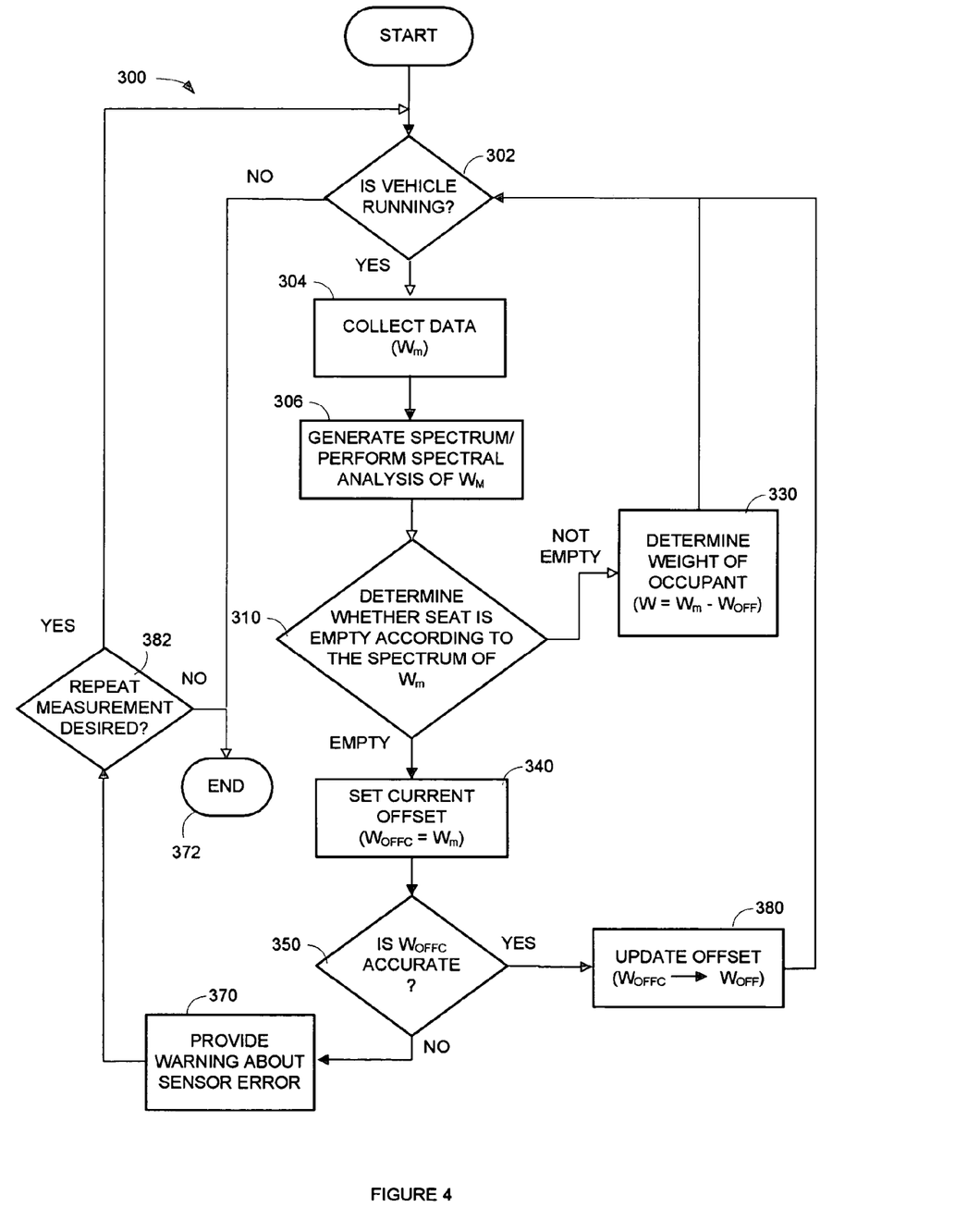
FIG. 4 is a flow chart of a process for determining the weight of a seat occupant.

An exemplary process 300 for determining the weight of a seat occupant is shown in FIG. 4. In general, the process 300 includes, determining whether the seat is empty, determining the offset if the seat is empty, and determining the weight of the occupant if the seat is not empty. In addition, the process 300 may include evaluating the accuracy of the offset. The process begins at step 302, where it is determined whether a vehicle in which the system is installed is running. Alternately, the process may begin at step 304 to, for example, measure the offset of any sensors located under a driver seat. If the vehicle is running, of if the process begins at step 304, data indicating the total force exerted on the seat, $W_m$, is measured or otherwise collected at step 304. $W_m$ may be measured by sensors located within the seat. Once $W_m$ is measured, a spectral analysis of the data is performed (step 306) and a determination is made as to whether the seat is empty based on the spectrum of $W_m$ (step 310). As shown in FIG. 4, step 310 may result in one of two determinations regarding the occupancy of the seat—"empty" or "not empty." In addition, step 304 may result in a third determination—"unknown." This determination may result when a very light occupant is on the seat and/or the vibrations caused by the vehicle are not consistent.

If it is determined that the seat is empty, an initial or current offset $W_{OFFC}$ is set at step 340 to the measured force or weight $W_m$. In the embodiment shown, the accuracy of the measured offset is compared with a preselected value, such as 10 kg at step 350. If $W_{OFFC}$ is greater than this value, $W_{OFFC}$ may be insufficiently accurate, and may indicate a failure of one or more sensors. Therefore, if $W_{OFFC}$ is greater than the preselected value, a warning regarding a potential sensor or other failure may be provided (step 370) and the process may subsequently terminate (step 372). If, however, $W_{OFFC}$ is smaller than the preselected value, $W_{OFFC}$ may be sufficiently accurate, and the current offset value may be redefined as an offset $W_{OFF}$ as shown at step 380. As shown at step 382, steps 302, 304, 306, 310, 340, 350, 370, and 380 may be repeated, as appropriate, with an update of the offset occurring when $W_{OFFC}$ is sufficiently accurate, so long as it is determined in step 302 that the vehicle is running and in step 310 that the seat is empty. For example, the system might be configured to perform a predetermined number of iterations through steps 302-370 before ending evaluation of the sensors.

If it is determined in step 310 that the seat is not empty, the weight of the occupant is determined at step 330. The weight of the occupant may be determined as a function of the offset $W_{OFF}$ and the total force exerted on the seat $W_m$ according to the following formula:

$$W = W_m - W_{OFF}, \quad (2)$$

where W is the weight of the occupant.

If it is determined in step 310 that the occupancy of the seat is "unknown" (not shown), the weight of the occupant may be determined, but without offset correction. Thus, in this case, the weight of the occupant W may equal the force exerted on the seat $W_m$.

Figure 5:
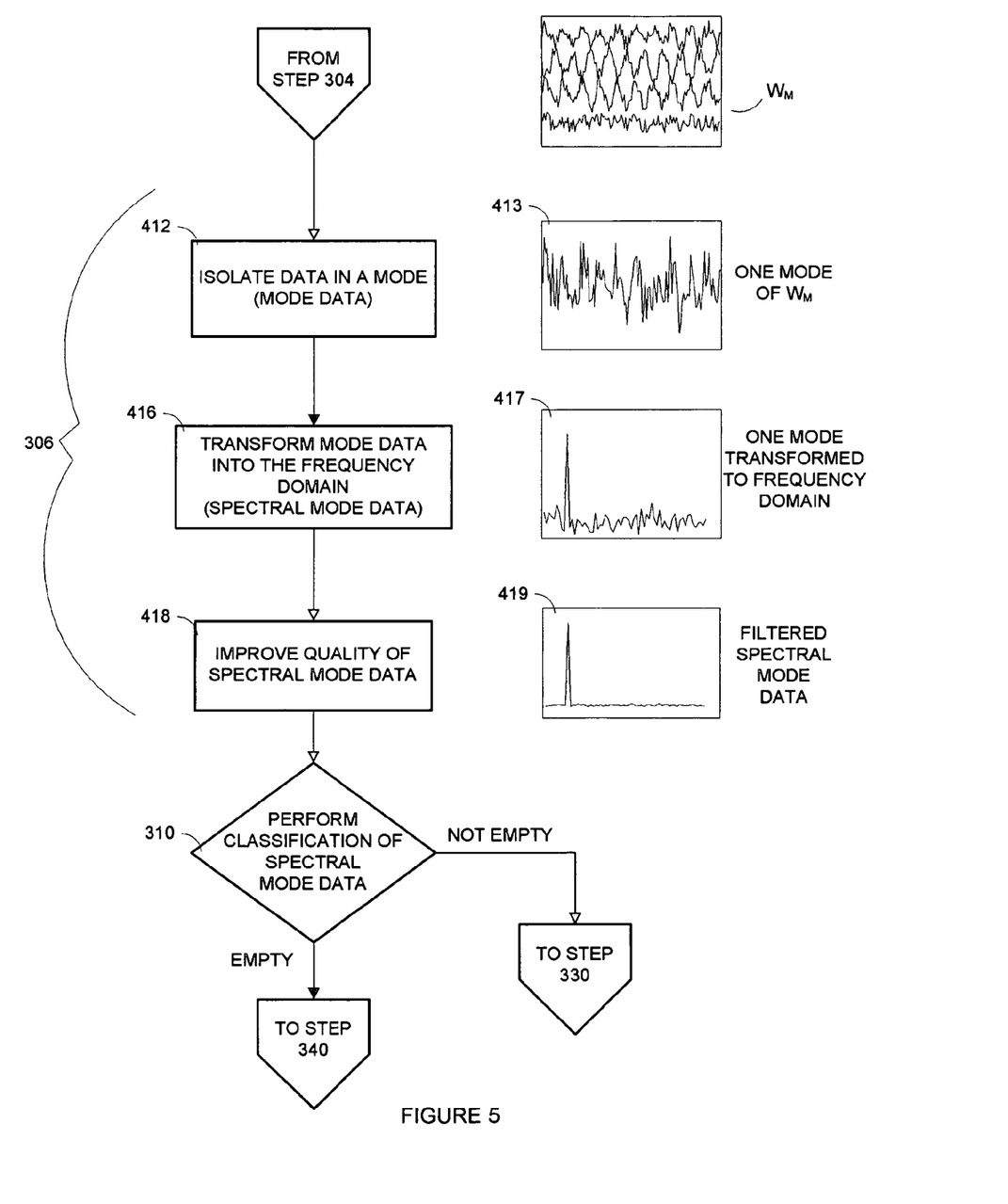
FIG. 5 is a flow chart of processing carried out to determine whether a seat is empty according to the spectrum of a measured force on a seat.

The spectral analysis performed in step 306 and determination made in step 310 are shown in more detail in FIG. 5. Embodiments of the invention may treat determining whether the seat is empty as a classical detection problem, in which there is a source (the seat) for which one of two or more hypotheses are true (e.g., empty, not empty and unknown). Each hypothesis is associated with a result (e.g., a seat weight) that may be measured and used to decide which hypothesis is correct. This decision process is complicated by the fact that there is an intervening probabilistic transition mechanism, which produces a relatively random output or observation (e.g., the total force measured by the sensors). Nonetheless, the observation or observations may be used to make decisions by characterizing these probabilistic mechanisms. For example, the observations may be of a mechanical nature and have an associated spectrum, and the process 300 for determining whether a seat is empty may include a decision rule that utilizes the observations to decide which hypothesis is true.

The process 300 may use a statistical approach to classification, which classifies force information. As previously discussed, measured force data may include forces in addition to the weight of the occupant, some of which may be uncontrollable, unpredictable, or both. Furthermore, these forces may be difficult or costly to measure. In effect, these forces represent random sources of variation that lend themselves to the use of statistical methods for classification.

As shown in FIG. 5, data $W_m$ collected by, for example, sensors located under the seat of automobile 105 (see FIG. 1), includes a time domain (temporal) signal from each sensor. For example, the temporal signal from a sensor "i" may be defined as a vector "xi." If the temporal signals are digital, the vectors may include "k" elements representing the number of data points taken in a time period. For example, the sensors may sample the data 64 times each second. Therefore, in this case, $$k=64. \quad (3)$$

Because multiple sources collect the data xi, and each xi includes multiple modes, the xi from each sensor is combined and a single mode isolated as shown at step 412. For example, four temporal signals (x1, x2, x3, and x4) may be combined to define a 4 X k matrix "X":

$$X = \begin{bmatrix} x11 & x21 & x31 & x41 \\ x12 & x22 & x32 & x42 \\ \vdots & \vdots & \vdots & \vdots \\ x1k & x2k & x3k & x4k \end{bmatrix}$$

$X_k$ represents the $k^{th}$ element (a vector) of X. In general the number of modes that may be isolated are equal to the number of temporal signals xi or the number of sensors used to collect xi.

In the embodiment shown, a linear projection is used to isolate modes. Linear projection is an operation in which a vector of a certain dimension is transformed to another vector having the same or smaller dimension. For example, the linear projection may be accomplished by the dot product of $X_k$ with a vector "C." The values of the elements of C depend upon the mode that is to be isolated. For example, C may have the following values: C=[1 1 1 1] to isolate the vertical vibration mode, C=[1 −1 −1 1] to isolate the horizontal vibration mode, C=[1 1 −1 −1] to isolate the lateral vibration mode, and C=[1 −1 1 −1] to isolate the flexure vibration mode. In the example shown in FIG. 5, one mode 413 is isolated to produce a signal representing a single mode ("mode data"). In this example, the mode data may be referred to as the weight $W_k$, which may be expressed by the following equation:

$$w_k = C \cdot X_k, \quad (4)$$

where C=[1 1 1 1]

The mode data $w_k$ may be transformed into the frequency domain (step 416) to produce a signal representing the spectrum of the mode data ("spectral mode data") R(f) or 417. R(f) is a vector with elements r(fj) that each represent the amplitude of a given frequency component present in $W_k$. Many methods may be used to transforming $w_k$ into R(f), such as a Fourier transform or a Haar transform. Further, the element representing the mean of the data may be removed because offsets may be indistinguishable from small objects. By removing the mean (or DC) component, fixed load variations are reduced, leaving occupant motion and vehicle dynamics as the two primary data generation mechanisms.

In addition, because the spectral mode data 417 may include noise, the quality of the spectral mode data may be improved. For example, the spectral mode data R(f) may be filtered (at step 418) to generate a filtered signal or filtered data 419. Filtering helps to improve the signal-to-noise ratio of the spectral mode data 41. The spectra may be filtered in an element-wise fashion. Examples of filtering methods include IIR, FIR, and adaptive filtering.

The use of a variable (adaptive) filtering technique has advantages because not all spectra are representative of the same physical phenomenon. For example, when occupant weight is being determined in a motor vehicle, much of the dynamic content of the signal is caused by movement of the vehicle and hence is dictated by variable road and driving conditions. Under such circumstances, the input excitation is non-stationary and, therefore, the output may not correspond to one of the modeled cases (discussed in connection with FIG. 6). For example, during normal driving events, there may be periods during which there is very little or no spectrum because the vehicle is not moving. Therefore, to avoid misclassification of the weight data due to uncontrolled variation of the input excitation, only spectra of similar power may be combined using, for example, a block averaging process. For example, the block may include a particular number of samples, such as that corresponding to one minute of data. Further, each spectrum may be filtered differently and the spectrum itself may be smoothed by various combinations of adjacent spectra to enhance key spectral features. Regardless of the filtering method used, the goal is to only use segments similar to those upon which probabilistic models were built so that the spectrum represents the modeled behavior, which helps ensure proper classification. After the adaptively selected spectra are averaged (or integrated), they may be normalized by dividing each spectral component by the total spectral power to help ensure compatibility with the model used in classification.

Figure 6:
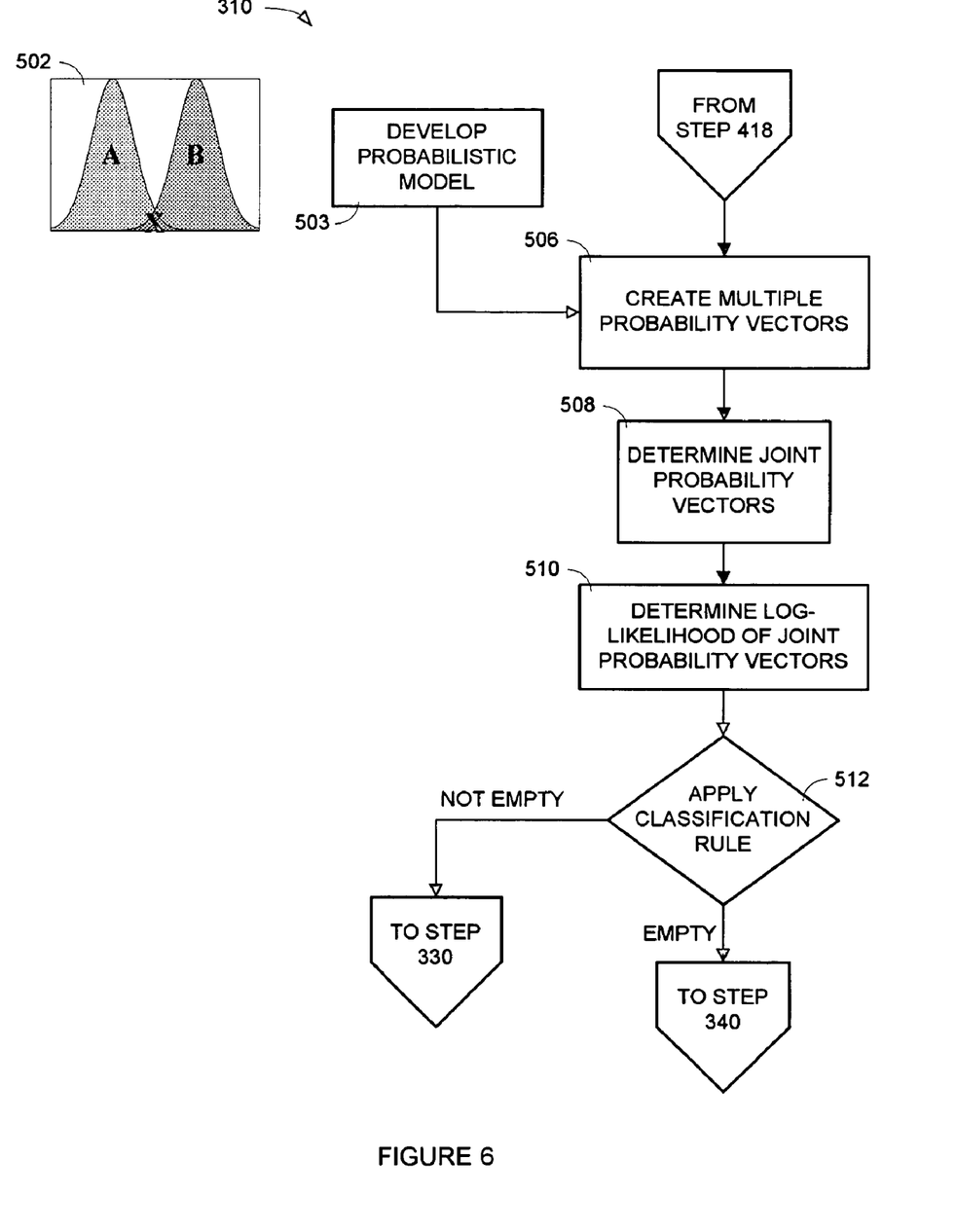
FIG. 6 is a flow chart of classifying spectral mode data.

Once the spectral mode data is filtered or improved in step 418, the larger process encompassed by step 306 is complete and the spectral mode data R(f) is classified (step 310) into one of two categories, such as "empty" or "not empty." In addition, the spectral mode data may be classified into a third category, such as "unknown." Performing classification of spectral mode data is shown in greater detail in FIG. 6. Classification may be based on a probabilistic model 502. Development of the probabilistic model 502 is shown at step 503 and is generally performed prior to determining the weight of a seat occupant. In general, the spectral mode data R(f) includes spectral analysis, which assigns probabilities to each of the spectral components based on the probabilistic model 502, which in the embodiment shown is for one of two classes—empty and not empty. Representations of the class spectra may be derived from the data used in the modeling process.

In the embodiment shown, the initial step in the classification process is to create multiple probability vectors (step 506), one for each class. In effect, for each frequency "$f_j$" in R(f), there exists a probability density function "$f_j(R(f_j))$" based on the normalized amplitude $R(f_j)$ as associated with each class. These probability density functions are vectors, and may be referred to as "probability vectors." "E" is the probability vector for the empty class, with elements "$e_j$." "NE" is the probability vector for the not empty class, with elements "$ne_j$." The probability vectors may be defined by the following equations,:

$$E = Pr(R|H_0) \quad (5)$$

$$NE = Pr(R|H_1) \quad (6)$$

Joint probability vectors are determined (step 508) by determining the product of all of the elements in the probability vectors. The log likelihood of the joint probability vectors is then determined (step 510) according to the following equations.

$$L_E = Sum[\log(e_j) \text{ over all } j] \quad (7)$$

$$L_{NE} = Sum[\log(ne_j) \text{ over all } j] \quad (8)$$

A classification is then applied (step 512) to determine whether the seat is empty. For example, the following classification rules may be applied:

$$\text{If } L_E - L_{NE} > 0, \quad (9)$$

the information is classified as "empty"

$$\text{If } L_E - L_{NE} < 0, \quad (10)$$

the information is classified as "not empty"

Further, a third classification rule may be applied for the classification "unknown." This may be used in cases where there are irregularities, such as a divide by zero, a log of a zero, or when $L_E - L_{NE} = 0$. In addition, this classification may be used so that no decision (classification) is made unless a threshold is met. For example, this threshold may be referred to as "$\epsilon$," and the classification rule may be defined by the following equation:

$$|L_E - L_{NE}| < \epsilon \quad (11)$$

where $\epsilon$ is a small positive number, the information is classified as "unknown" and no decision as to whether the seat is empty or not; otherwise, equations (9) and (10) are applied. The result of the classification is a decision as to whether the seat is empty or not empty (or no decision if the classification is "unknown"). This decision may then be used to determine an offset of the sensors and/or to determine the weight of the seat occupant.

Table 1 below illustrates the impact that bandwidth and sampling frequency can have on embodiments of the invention. As can be seen below, if the bandwidth and sampling frequency are relatively low, insufficient data is collected to provide an appropriate spectrum. As explained above, the spectrum provides information with which to make a decision regarding the classification of an occupant seat.

TABLE 1

Spectral Empty Detection as a Function of Bandwidth

| Bandwidth (Hz) | Sampling Frequency (Hz) | Empty Detection Rate (%) | Not Empty Detection Rate (%) |
|---|---|---|---|
| 1 | 2 | 0 | 0 |
| 2 | 4 | 0 | 0 |
| 4 | 8 | 0 | 6 |
| 8 | 16 | 0 | 31 |
| 16 | 32 | 34 | 76 |
| 32 | 64 | 88 | 83 |
| 64 | 128 | 94 | 83 |

Notes:
All data was collected on a Lear U152 seat instrumented with four iBolt sensors v5.3.
All data collection was performed while driving on various surfaces.
The "Empty" database contained 265 spectra.
The "Not Empty" database contained 875 spectra with masses from 1 to 200 Kg.

While various embodiments have been described, it will be apparent to those of ordinary skill in the art that many more embodiments and implementations are possible. Accordingly, the invention is not to be restricted except in light of the attached claims and their equivalents.

What is claimed is:

1. A module for determining whether a seat is empty, the module comprising:
   a projection module configured to receive force data that includes a plurality of modes, and to isolate data for one of the modes;
   a transform module configured to communicate with the projection module, and to transform the data for one of the modes into a frequency domain, thus producing spectral mode data; and
   a spectral analysis module configured to communicate with the transform module, and to classify the spectral mode data.

2. The module of claim 1 further comprising a filter module configured to communicate with the transform module and the spectral analysis module, and to filter the transformed mode data.

3. The module of claim 1, wherein the spectral analysis module includes a probabilistic model.

4. The module of claim 3, wherein the spectral analysis module is further configured to classify the spectral mode data by:
   creating a plurality of probability vectors according to the probabilistic model;
   determining a plurality of joint probability vectors;
   determining a log-likelihood of the joint probability vectors; and
   applying a classification rule to the log-likelihood to classify the spectral mode data.

5. The module of claim 1, wherein the plurality of modes include vibrational modes.

6. The module of claim 1, wherein one of the plurality of modes includes a vertical mode.

7. A system for determining a weight of an object on a seat, the system comprising:
   a sensor configured to detect a force exerted by an object;
   a first module configured to use spectral analysis to determine an offset of the sensor; and a second module configured to determine the weight of the object as a function of the force exerted on the seat and the offset of the sensor.

8. The system of claim 7, wherein the second module determines the weight of the object by subtracting the offset from the force exerted on the seat.

9. The system of claim 7, wherein the force includes a plurality of modes, and the first module includes:
a projection module in communication with the a plurality of sensors, and configured to receive weight data that includes a plurality of modes and isolate data for one of the modes;
a transform module in communication with a linear projection module, and configured to transform the data for one of the modes into a frequency domain, thus producing spectral mode data; and
a spectral analysis module in communication with the transform module, and configured to classify the spectral mode data.

10. The system of claim 9, wherein the first module further includes a filter module in communication with the transform module and the spectral analysis module and configured to filter the transformed mode data.

11. A method for determining whether a seat is empty, the method comprising:
isolating one of a plurality of modes of force data;
transforming one of the modes of the force data into a frequency domain, thus producing transformed mode data; and
performing spectral analysis on the transformed mode data to classify the transformed mode data.

12. The method of claim 11, wherein the transformed mode data is classified as "empty."

13. The method of claim 11, wherein the transformed mode data is classified as "not empty."

14. The method of claim 11, wherein the transformed mode data is classified as "unknown."

15. The method of claim 11 further comprising filtering the transformed mode data.

16. The method of claim 15, wherein spectral analysis is performed according to a probabilistic model.

17. The method of claim 16, wherein performing spectral analysis further includes:
creating a plurality of probability vectors according to the probabilistic model;
determining a plurality of joint probability vectors;
determining a log-likelihood of the joint probability vectors; and
applying a classification rule to the log-likelihood to classify the spectral mode data.

18. A computer readable storage medium comprising computer-executable instructions for analyzing a force on a seat by:
isolating one of a plurality of modes of force data;
transforming one of the modes of the force data into a frequency domain, thus producing transformed mode data; and
performing spectral analysis on the transformed mode data to classify the transformed mode data.

19. A signal including representations of computer-executable instructions for analyzing a force on a seat by:
isolating one of a plurality of modes of force data;
transforming one of the modes of the force data into a frequency domain, thus producing transformed mode data;
performing spectral analysis on the transformed mode data to classify the transformed mode data; and
determining the weight of the object as a function of the total force and the force that is not due to the weight of the object.

20. An device for analyzing a load on a surface, the device comprising:
a projection module configured to receive force data that includes a plurality of modes and to isolate data for one of the modes;
a transform module configured to communicate with the projection module and to transform the data for one of the modes into a frequency domain, thus producing spectral mode data; and
a spectral analysis module configured to communicate with the transform module and to classify the spectral mode data.

21. The device of claim 20 further comprising a filter module configured to communicate with the transform module and the spectral analysis module, and to filter the transformed mode data.

22. The device of claim 20, wherein the spectral analysis module includes a probabilistic model.

23. The device of claim 22, wherein the spectral analysis module is further configured to classify the spectral mode data by:
creating a plurality of probability vectors according to the probabilistic model;
determining a plurality of joint probability vectors;
determining a log-likelihood of the joint probability vectors; and
applying a classification rule to the log-likelihood to classify the spectral mode data.

24. The device of claim 20, wherein the plurality of modes include vibrational modes.

25. The module of claim 20, wherein one of the plurality of modes includes a vertical mode.

26. A vehicle having a system to detect the presence and weight of an occupant, the system comprising:
a projection module configured to receive force data that includes a plurality of modes, and to isolate data for one of the modes;
a transform module in communication with the projection module, and configured to transform the data for one of the modes into a frequency domain, thus producing spectral mode data; and
a spectral analysis module in communication with the transform module, and configured to classify the spectral mode data.

27. A vehicle of claim 26 further comprising:
a seat;
a control unit configured to generate an output; and
at least one sensor configured to sense a weight of the seat and, when present, a weight of an object in the seat and to communicate with the control unit.

28. A vehicle of claim 27 further comprising an occupant restraint system configured to receive a command signal based on the output of the control unit.

* * * * *

UNITED STATES PATENT AND TRADEMARK OFFICE
CERTIFICATE OF CORRECTION

| | | |
|---|---|---|
| PATENT NO. | : 7,577,506 B2 | Page 1 of 1 |
| APPLICATION NO. | : 11/188318 | |
| DATED | : August 18, 2009 | |
| INVENTOR(S) | : Chad Van Fleet | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this

Seventh Day of September, 2010

David J. Kappos
*Director of the United States Patent and Trademark Office*